(12) United States Patent
Jakobson et al.

(10) Patent No.: US 6,732,153 B1
(45) Date of Patent: May 4, 2004

(54) UNIFIED MESSAGE PARSER APPARATUS AND SYSTEM FOR REAL-TIME EVENT CORRELATION

(75) Inventors: Gabriel Jakobson, Brookline, MA (US); Mark Weissman, Framingham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/576,296

(22) Filed: May 23, 2000

(51) Int. Cl.$^7$ ............................................. G06F 15/16

(52) U.S. Cl. ........................................ 709/206; 705/8

(58) Field of Search ................................. 709/226, 227, 709/246, 206, 106, 102, 207, 230, 251; 703/22; 705/8; 370/236; 714/724; 717/136; 379/88

(56) References Cited

U.S. PATENT DOCUMENTS

| | | |
|---|---|---|
| 5,063,523 A | 11/1991 | Vrenjak |
| 5,193,152 A | 3/1993 | Smith |
| 5,257,371 A | 10/1993 | Anezaki |
| 5,276,880 A | 1/1994 | Platoff et al. |
| 5,339,421 A | 8/1994 | Housel, III |
| 5,388,189 A | 2/1995 | Kung |
| 5,488,569 A | 1/1996 | Kaplan et al. |
| 5,495,470 A | 2/1996 | Tyburski et al. |
| 5,680,551 A * | 10/1997 | Martino, II .................. 709/226 |
| 5,715,394 A | 2/1998 | Jabs |
| 5,751,914 A | 5/1998 | Coley et al. |
| 5,761,502 A | 6/1998 | Jacobs |
| 5,805,808 A | 9/1998 | Hasani et al. |
| 5,832,228 A | 11/1998 | Holden et al. |
| 5,925,108 A | 7/1999 | Johnson et al. |
| 5,953,404 A | 9/1999 | Fikis et al. |
| 6,041,306 A * | 3/2000 | Du et al. ....................... 705/8 |
| 6,047,323 A * | 4/2000 | Krause ....................... 709/227 |
| 6,339,795 B1 * | 1/2002 | Narurkar et al. ............. 709/246 |
| 6,418,400 B1 * | 7/2002 | Webber ....................... 703/22 |

OTHER PUBLICATIONS

Chen et al; An object–based Model for Dependable Real–Time Distributed Systems; IEEE 1996.*
HISI1999; www.cs.tcd.ie/Benjamin.Jung/Publications . . . 99/HISI1999.pdf.*
design015.PDF ;www.liacs.nl/~jdawn/design015.pdf.*
Brenner et al., "Grace—Global Real—Time Advanced Correlation Environment," Version 1.2, (1999).
Goyal et al., "Cellular Network Management: Need and Evolution of Intelligent Integrated Systems," GTE Laboratories, 355–363.
IMPACT, User's Guide, GTE Laboratories.
Jakobson et al., "Knowledge–Based GUI for Network Surveillance and Fault Analysis," 0–7803–1811–0/94, 846–855, IEEE (1994).
Jakobson et al., "Cellular Network Capacity Planning Using Dependency–Based Data Modeling," 0–7803–4351–4/98, 706–712, IEEE (1998).

*Primary Examiner*—Jack B. Harvey
*Assistant Examiner*—Thong Vu
(74) *Attorney, Agent, or Firm*—Leonard C. Suchyta, Esq.; Joel Wall, Esq.; Jeffrey Berkowitz, Esq.

(57) ABSTRACT

Systems and methods consistent with the present invention perform message parsing in a distributed component-based network management system using a parsing knowledge structure called a Message Class Grammar (MCG) containing the set of all potential pre-calculated parsing sequences for an active network element. The MCG may be customized to the messages of different active network elements. A universal parsing procedure (UPP) may be used to traverse the hierarchy structure of the MCG. Tracing the MCG hierarchy from the root node along class-subclass arcs until a terminal node is reached determines the parsing sequence for a particular message. The MCG may be developed with a text editor or with a graphical user interface that enables a non-programmer to edit the parser structure.

10 Claims, 8 Drawing Sheets

OTHER PUBLICATIONS

Jakobson et al., "Alarm Correlation—Correlating multiple network alarms improves telecommunications network surveillance and fault management," 0890-8044/93, 52–58, IEEE (1993).

Kerschberg et al., "Intelligent Network Management: A Heterogeneous Knowledge Source Approach," 90CH2930-6/90/0000-0314, 314–316, IEEE (1990).

* cited by examiner

405 — MessageClass APX-OP {
410 — LifeSpan        10m
415 — Template        "Autoplex Alarm"
420 — Delay           "4 sec"
425 — FilterMode      SLOT
430 — InheritanceType Every
435 — TraversalType   Any
440 — Pattern         Pattern AUTOPLEX-BODY "^OP (^/r/n *)$.*$^A-Z *(A-Z0-9 *).*$"
445 — Parents         {AUTOPLEX-GENERIC}
450 — Children        {}
455 — Slots
{ {NIS-DSV-STATUS STRING SET}
{NIS-DSV-SEVERITY CASE $1 {"OOS MESSAGE STARTED" MAJOR}
{NIS-DSV-SLOT2 CASE $1 {MIN 10 HIGHEST}
{NIS-DSV-SLOT3 ORDERED "123" "ABC"}
{NIS-DSV-SLOT4 KEYLIST "(A 1) (B 2) (C3)" "A C"}
{NIS-DSV-SLOT5 PROPLIST "A 1 B 2 C 3" "A B"}
{NIS-DSV-SLOT6 STR2TIME 5/30/99 %m%d%y}
{NIS-DSV-SLOT7 TIME2STR 5/30/99 %m%d%y}
{NIS-DSV-SLOT8 SUBSTRING $2 {3 4} }
{NIS-DSV-SLOT9 PREDEFINED}
}
}

UNIFIED MESSAGE PARSER APPARATUS AND SYSTEM FOR REAL-TIME EVENT CORRELATION

Related Applications

Related patent applications filed on May 23, 2000 include SYSTEM AND METHOD FOR PROVIDING ADVANCED EVENT CORRELATION, Ser. No. 09/577,070; SYSTEM AND METHOD FOR PROVIDING AN INTERNET-BASED CORRELATION SERVICE, Ser. No. 09/577,035; and SYSTEM AND METHOD FOR PROVIDING A GLOBAL REAL-TIME ADVANCED CORRELATION ENVIRONMENT ARCHITECTURE (as amended), Ser. No. 09/577,071;

BACKGROUND OF THE INVENTION

The present invention relates to the field of real-time network fault and performance management systems, and more particularly to a knowledge-based method of parsing alarm, status, performance and other event messages generated by active elements of managed networks.

Modern networks, including fixed, wireless, telecommunication and enterprise networks, are complex dynamic systems that often have thousands of interconnected active elements, such as switches, digital cross-connects, routers, bridges, environmental devices, and power systems. Tens to hundreds of events (messages) per second pass the communication trunks connecting the elements. To monitor the status of networks, perform fault root cause analysis, aggregate messages, and generate trouble tickets, all of the messages generated by active network elements need to be parsed and analyzed.

However, current methods of message parsing are rigid. They are based exclusively on hardcoded parsing and generation algorithms. Any change in the message processing algorithms requires re-programming and compilation of the full message-processing module. This hampers the efficiency of constructing and supporting the message parsing components of network management systems for a variety of reasons.

Networks contain a large variety of active network elements produced by different vendors. The messages generated by the active elements of different vendors are incompatible syntactically and inconsistent semantically. That is, current message processing algorithms require reprogramming and compilation for each of the many message types. However, network operations personnel are not, in general, experienced programmers capable of building parsers. Therefore, they are not able to customize the parsing process to the specifics of managed networks. Furthermore, the rigidity of current methods, and hence lack of interoperability with various active network elements, is not compliant with the open architecture of distributed network management, which stresses interoperability among various elements.

SUMMARY OF THE INVENTION

Systems and methods consistent with the present invention accomplish these needs by supplying a universal parsing service that operates over various levels of message classes. The parsing service also provides a graphical user interface (GUI) editing tool that allows developers to define message class objects. Systems and methods consistent with the present invention also provide a declarative message parsing knowledge structure allowing customization of the parsing service from the messages of different active network elements (NEs) in a correlation network environment.

In accordance with one aspect of the present invention, as embodied and broadly described herein a system for parsing network messages comprising a parser knowledge structure comprising a hierarchal graph of message classes, wherein each message class parses a portion of the message, and a universal parsing procedure means for driving the parser knowledge structure. In another embodiment the system may further comprise the hierarchal graph of message classes includes a root node and at least one terminal node, and the universal parsing procedure means comprises instructions on how to traverse the hierarchy of message classes from the root node to the terminal node, wherein the message is completely parsed after reaching the terminal node.

In accordance with another aspect of the present invention, as embodied and broadly described herein a method for parsing messages in a distributed-component network management system, the method performed by a universal parsing procedure means, comprising receiving a raw message from the distributed-component network management system, parsing the raw message by traversing a parser knowledge structure comprising a hierarchal graph of message classes from a root node to a terminal node, wherein each message class parses a portion of the message and the message is completely parsed when a terminal node is reached, and providing the parsed message to the notification service.

In accordance with yet another aspect of the present invention, as embodied and broadly described herein a computer readable medium including computer-executable instructions for a universal parsing procedure means to perform a method comprising the steps of receiving a raw message from a notification service, parsing the raw message by traversing a parser structure comprising a hierarchal graph of message classes from a root node to a terminal node, wherein each message class parses a portion of the message and the message is completely parsed when a terminal node is reached, and providing the parsed message to the notification service.

In accordance with yet another aspect of the present invention, as embodied and broadly described herein a computer readable medium including computer-executable instructions for a message class in a parsing knowledge structure comprising a hierarchal graph of message classes having a root node and at least one terminal node to perform a method comprising the steps of retrieving a message, determining whether a pattern string of a message class matches the message, parsing a portion of the message corresponding to the pattern string if the pattern string matches the message, and saving a remaining portion of the message to be parsed in a predetermined location.

The summary and the following detailed description should not restrict the scope of the claimed invention. The accompanying drawings, which form part of the detailed description, shown one embodiment of the invention and, together with the description, explain the principles of the invention.

DETAILED DESCRIPTION

Systems and methods consistent with the present invention overcome the need for building different parsers customizable for each type of active elements in networks by supplying a parsing service based on a message parsing knowledge structure called a Message Class Grammar (MCG). MCG drives a universal parsing procedure (UPP) and may be customized to the messages of different active elements. Since the idiosyncracies of MCG are close to domain concepts, the present invention is more readily understandable to the domain experts, or users, who are not necessarily experienced programmers.

Figure 1:
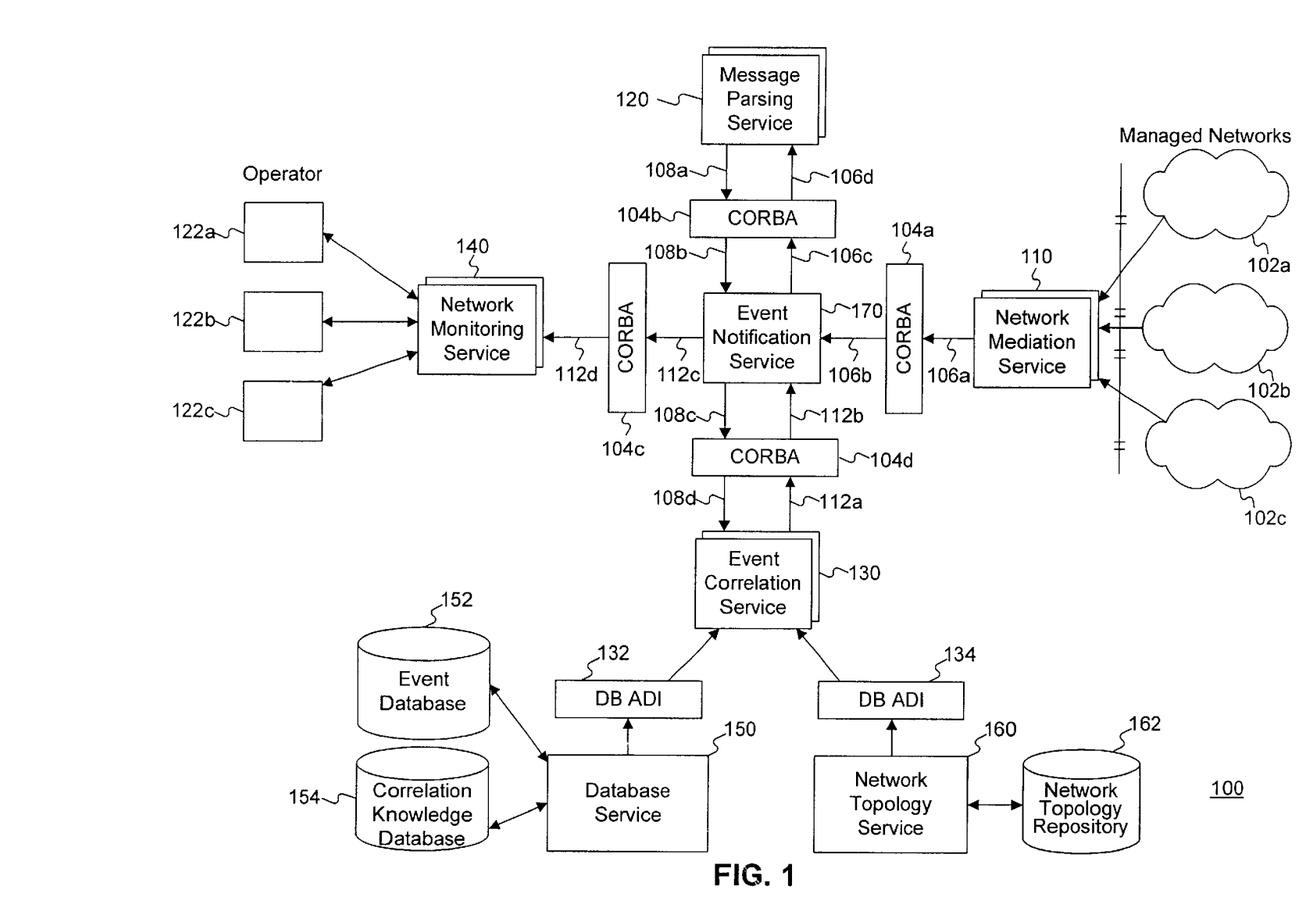
FIG. 1 is a block diagram showing an exemplary architectural framework of a distributed network event management system consistent with systems and methods of the present invention.

An architecture for a distributed component-based network event management system suited for use with the present invention is indicated generally in FIG. 1. The distributed network event management system 100, described more fully in copending application Ser. No. 09/577-071, represents a real-time common event correlation service for a broad variety of network management operations including complex network fault, performance, security, service quality management, configuration, and test management systems.

As shown in FIG. 1, the distributed network system 100 may be used to operate multiple diverse networks 102a–102c. The system 100 includes CORBA-based communication interfaces 104a–104d, raw event channels 106a–106d, parsed event channels 108a–108d, correlated event channels 112a–112d, database application program interfaces 132 and 134, a network mediation service 110, a message parsing service 120, an event correlation service 130, a network monitoring service 140, a database service 150, a network topology service 160, an event notification service 170; an event database 152, a correlation knowledge database 154, and a network topology repository 162. The multiple services listed above act as the operational infrastructure of the distributed event management architecture depicted in FIG. 1 and enable operators to manage networks 102a–102c. Each of the services represent a software process that performs a specific function with encapsulated idiosyncracies and standard inter-component communication protocols. As such, system 100 may be customized in terms of functionality, scale and complexity. Different functionality can be reached by customizing the services with different knowledge bases, while scalability and complexity are achieved by invoking multiple instances of the same services.

A service may provide instantaneous "real time" support, or it may provide interactive support. In a preferred embodiment, network mediation service 110, message parsing service 120, event correlation service 130, and network monitoring service 140 are real time services while database 150 and network topology services 160 are interactive services. Those skilled in the art will appreciate the fact that any combination of services can be real time or interactive, and that each service can be hosted on one or a plurality of computer workstations.

The process of examining and validating the network traffic crossing an interface between managed networks 102a–102c and management system 100 is called mediation. Mediation is, therefore, a set of procedures and capabilities that act together to maintain both service, network, and physical element integrity. Here, network mediation service 110 provides connectivity to network elements 102a–102c, protocol conversion, data adaption, and network alarm/fault, performance, configuration and test data collection. It is coupled to one or more managed networks 102a–102c, each supplying raw message (event) streams. Network mediation service 110 sends the raw messages over raw message channel 106a–106b to event notification service 170 via communication interface 104a.

Event notification service 170 receives the raw messages and passes them to message parsing service 120 using raw message channel 106c–106d and communication interface 104b. Method parsing service, described more fully later, provides customizable capabilities for parsing raw messages generated by different networks elements. It also may perform single network element level information processing functions, such as event filtering and automatic clearing of events. Here, message parsing service 120 receives raw messages from network elements 102a–102c via network mediation service 110 and event notification service 170 and produces parsed messages. Message parsing service 120 sends the parsed message to event correlation service 130 via event notification service 170, parsed message channels 108a–108d, and communication interfaces 104b and 104d.

Event correlation service 130 is a service designed to perform real-time event correlation and explanation. Event correlation service 130 receives parsed messages from message parsing service 120 and produces correlated events. It then sends the correlated events or messages to network monitoring service 140 via correlated event channel 112a–112d, communication interfaces 104c 104d, and event notification service 170.

Network monitoring service 140 is a basic network management operation that provides network fault, configuration, performance, test, administration, and security management functions. It is coupled to one or more operator workstations 122a–122c that allow network administrators or developers to edit message classes and monitor system 100.

As described above, each of the real-time services, network mediation service 110, message parsing service 120, event correlation service 130, and network monitoring service 140 communicate via event notification service 170. Event notification service 170 acts as a pipe or switchboard, enabling sophisticated communication of real-time events between multiple event clients and servers. It allows routing of messages and events to the connected service that subscribe to receive a particular type or level of event. Some features of event notification service 170 include asynchrony, event subscription, multicast event routing, event filtering, quality of service and structured events.

Event notification service 170 communicates with the real-time services through communication interfaces 104a–104d. Communication interfaces 104a–104d may use various technologies such as the Common Object Request Broker Architecture (CORBA), the Distributed Component Object Model (DCOM), the Remote Method Invocation (RMI), or the use of one or more shared libraries without departing from the scope of the present invention. In the embodiment described herein, communication interfaces 104a–104d are CORBA interfaces and event correlation system 100 is implemented using CORBA architecture. Here, CORBA interfaces 104a–104d provide a mechanism by which objects, applications or services can make requests to and receive responses from other objects managed by the system 100. In operation, a client service passes an object reference identifying the desired object operation along with any required parameters to a CORBA interface 104a–104d. After receiving the object operation request from the client service, the CORBA interface 104a–104d uses the object reference to activate executable code which causes the desired operation to be performed. The results are passed back to CORBA interface 104a–104d, which passes them to the client service, completing the object operation sequence.

In a preferred embodiment, all events processed by system 100 are Common Object Source Notification (CosNotification) structured events. CosNotification is a CORBA implementation that provides distributed object event distribution. The present embodiment may also utilize the extensible Markup Language (XML) to provide an extended protocol for efficiently encapsulating application data and transporting it to another location. XML data may be transmitted over CORBA in several ways. In a preferred embodiment, XML data is passed as a CORBA string. In essence, nested XML structures may be mapped directly into CORBA structures and CORBA structures may be mapped directly into XML strings. This approach allows clients and servers to benefit from the advantages of XML, while simultaneously relieving clients and servers from requiring XML parsers if they support CORBA.

A service that originates an event is an event supplier and a service that receives an event is an event consumer. In the present invention, suppliers and consumers are completely decoupled. In other words, a supplier has no knowledge of the number of consumers or their identities and consumers have no knowledge of the supplier that generated a given event. To support this model, CORBA uses an architectural element called an event channel. An event channel mediates the transfer of events between the suppliers and consumers as follows: 1) the event channel allows consumers to register for events, and stores this registration information; 2) the channel accepts incoming events from suppliers; and 3) the channel forwards supplier-generated events to registered consumers. Suppliers and consumers connect to the event channel and not directly to each other. From a supplier's perspective, the event channel appears as a single consumer; from a consumer's perspective, the channel appears as a single supplier. Any number of suppliers can issue events to any number of consumers using a single event channel. New suppliers and consumers can be easily added to the system, and they can connect to more than one event channel.

The interactive services include database service 150 and network topology service 160. These services are available on an on-call basis to provide the required knowledge, models, and data to support the real-time services. Database service 150 is a general service for data storage and retrieval from event database 152 and correlation knowledge database 154. Database service 150 is coupled to event correlation service 130 via a database application interface (DB API) 132. An example of an API that interfaces object-oriented application programs and relational databases is the open database connectivity (ODBC) driver, developed by Microsoft Corporation of Redmond, Wash. The Java™ database connectivity (JDBC™) driver, developed by Sun Microsystems of Mountain View, Calif., is another API used in a Java environment to interface object-oriented Java application programs and relational databases. While ODBC and JDBC are discussed above, those skilled in the art are aware that any comparable API can be similarly used. Network topology service 160 is coupled to event correlation service 130 via DB API 134. Network topology service 160 is a service for providing network topology modeling and repository functions, wherein network topology includes network element, network connectivity, and containment information.

Figure 2:
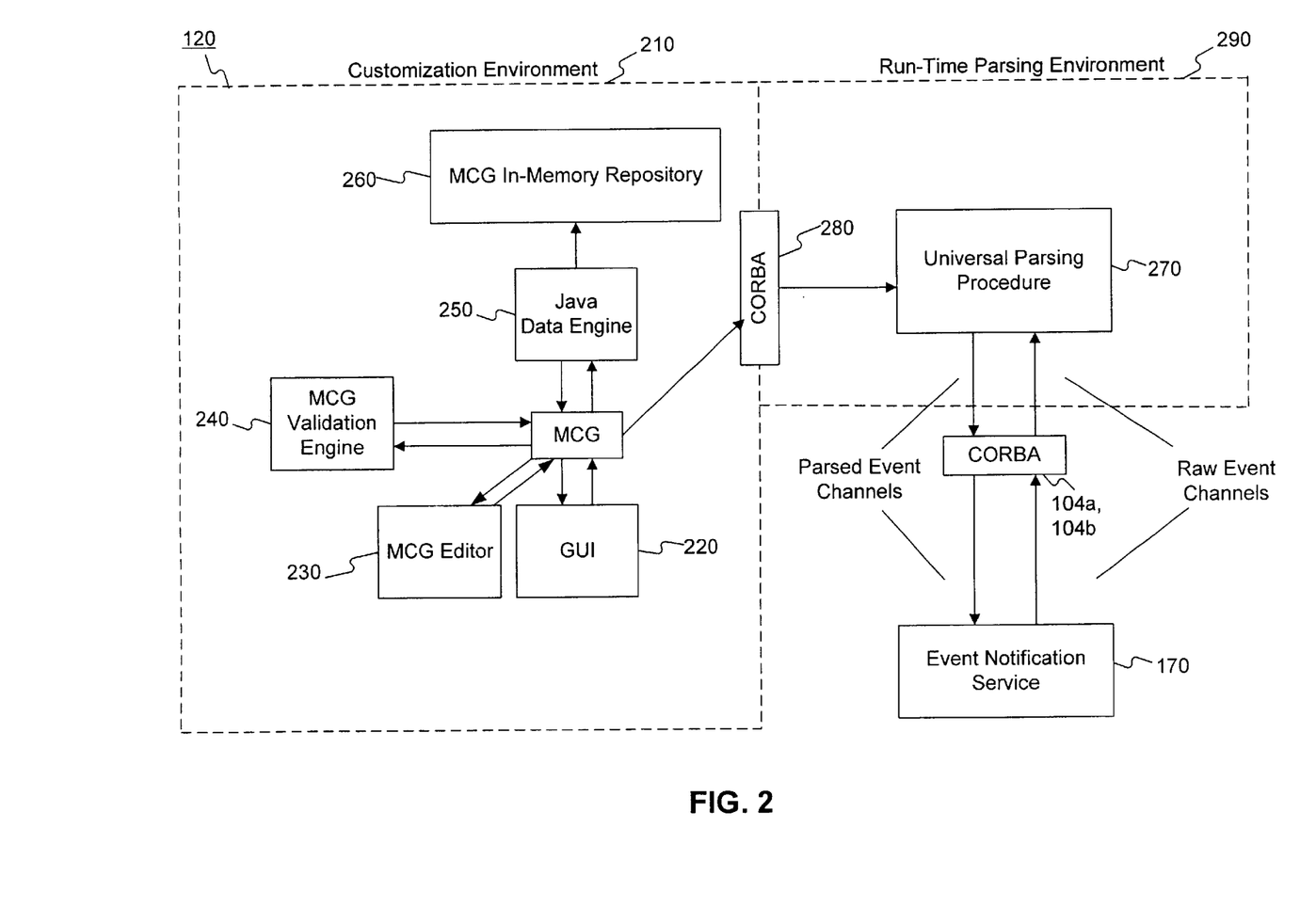
FIG. 2 is a block diagram of a universal message parser service consistent with the architectural framework depicted in FIG. 1.

FIG. 2 illustrates the two major environments of the message parsing service, a customization 210 and a run-time parsing 290, in which message parser 120 may be implemented. The customization environment is the environment 290 in which the Message Class Grammar (MCG) is built. MCG is a parsing knowledge structure of declarative specifications that describe "what" to parse rather than "how" to parse.

That is, unlike conventional parsers, which use procedural commands to explicitly describe how to perform each step of parsing, the present invention uses descriptive language to describe broadly what needs to be parsed. The descriptive language, or specifications, comprising the MCG uses terminology and entities of specific network management domain, familiar to network operations personnel. In this fashion, network operations personnel, who know what to parse, may customize the parser with the aid of a graphical user interface (GUI) even though they do not know how to program.

Figure 3:
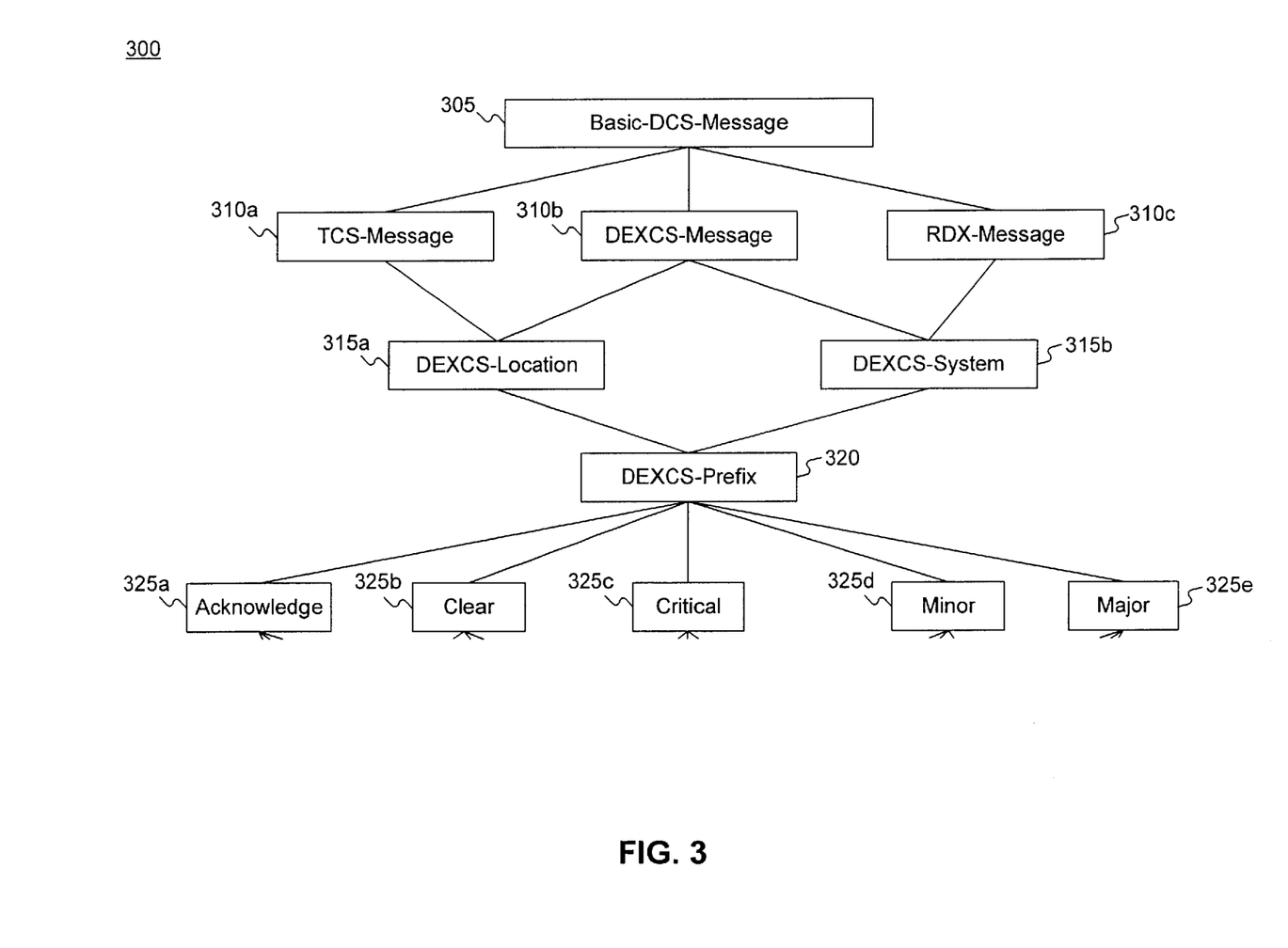
FIG. 3 is a block diagram showing an exemplary acyclic graphical representation of a message class hierarchy used in conjunction with systems and methods consistent with the present invention.

As shown in the example in FIG. 3, the MCG is a directed acyclic graph, whose nodes represent message classes and arcs correspond to class-subclass relations (i.e. parent-children relations) between the message classes. A message class is a structured object that specifies data and methods needed to parse a particular fragment of a message. Each node, in essence, is an expert on how to parse a particular subpart of the message. Traversing the message class hierarchy graph of the MCG from root node along class-subclass arcs until a terminal node is reached determines the parsing sequence for a particular message.

Returning now to FIG. 2, MCG is built using a customization environment 210. The customization environment 210 may be used to create a new MCG or edit an existing MCG. The customization environment 210 contains an MCG editor 230, a graphical user interface (GUI) 220, an MCG validation engine 240, an XML data engine 250 and an MCG in-memory repository 260. MCG editor 230 is intended for experienced programmers. It allows the programmer to quickly and efficiently edit the MCG using a conventional text editor such as "emacs". The user assumes responsibility for the correctness of the program with the MCG editor 230. Those familiar with the art can appreciate that several text editors may be used within the scope of the present invention.

GUI 220 is intended for network operations personnel who are not programmers. These users are familiar with domain terminology and the message class hierarchy of what needs to be parsed. Therefore, the declarative construction and domain specific nature of MCG aid in efficiently developing GUI 220. GUI 220 provides a structured, graphical guide to developing the MCG that protects the user from making errors. The MCG output of MCG editor 230 and GUI 220 is represented in XML, a document presentation language.

Once the MCG is built, the MCG validation engine 240 checks that the resulting MCG in XML format is valid. For example, validation engine 240 may check the correctness of the data types, the range of the data values, and the existence of circular references. Once validated, the MCG is stored in the MCG in-memory repository 260. The repository 260 uses an internal Javabased data representation for storing the MCG. The MCG is stored and retrieved from the repository 260 by a Java data engine 250. For example, Java data engine 250 may retrieve the MCG from repository 260 so that it may be edited using the MCG editor 230 or GUI 220.

Once the MCG is developed and validated, it may be retrieved from repository 260 by Java data engine 250 and made available to a universal parsing procedure 270 in the run-time parsing environment 290 via CORBA interface 280. The run-time parsing environment 290 is the environment in which the developed MCG is used for parsing. As shown in FIG. 2, the universal parsing procedure (UPP) 270 of the run-time environment 290 couples to event notification service 170 via CORBA interfaces 104a,104b. As discussed in reference to FIG. 1, raw messages are passed from managed networks 102a–102c to event notification service 170 over raw message channels. Event notification service 170 passes the raw messages (events) to the message parsing service 120, particularly the UPP 270, via a raw events channel.

UPP 270 of the message parsing service 120 uses a valid MCG from the customization environment to parse the raw messages received from the managed networks 102a–102c. Specifically, UPP 270 is a graph traversing procedure which describes how to process the acyclic graph of MCG. The UPP 270 begins at the root node of the MCG where it hands processing control to the root node. The root node then parses the beginning portion of the message and returns processing control to the UPP 270. The UPP 270 determines the next node, moves to the next node of the graph and hands it processing control. That node performs parsing on a specified portion of the message and returns control to the UPP 270. This procedure continues until the terminal node is reached. Once the terminal node is reached, the entire message is parsed. The parsed message is sent to event notification service 170 via a parsed events channel. Event notification service 170 routes the parsed messages to other services in the network. To parse messages from more than one active element, UPP 270 may be invoked multiple times. For example, to parse messages from two different active network elements, UPP 270 may be invoked twice so that each invoked UPP 270 may run a different MCG.

FIG. 3 represents a portion of an MCG for a digital cross-connect network. As shown in FIG. 3, the MCG is an acyclic graph. During a parsing procedure, the root node, in this case Basic-DCS-Message 305, parses the beginning portion of a raw message. The UPP 270 then traverses the message graph hierarchy and hands control to one of the children, TCS-Message 310a, DEXCS-Message 310b, or RDX-Message 310c. Each node has a pattern string which is compared to the raw message to be parsed. If the pattern matches the raw message, the lower class child parses the portion of the raw message represented by the matched pattern string. In this example, TCS-Message 310a and RDX-Message 310c each have one child DEXCS-Location 320a and DEXCS-System 320b, respectively. That is, if either TCS-Message 310a or RDX-Message 310c has a pattern string that matches the raw message, TCS-Message 310a or RDX-Message 310 parses a portion of the raw message corresponding to the matched pattern string. The UPP 270 traverses the message graph hierarchy to DEXCS-Location 320a from TCS-Message 310a or to DEXCS-System 310b from RDX-Message 310c. Similarly, if the pattern string of DEXCS-Message 310b matches the raw message, DEXCS-Message 310 parses the portion of the raw message corresponding to the matched pattern string. After DEXCS-Message 310 parses a portion of the raw message, UPP 270 traverses the message graph hierarchy and hands control to one of the children, DEXCS-Location 315a or DEXCS-System 315b. DEXCS-Location 315a or DEXCS-System 315b parses the next portion of the message. The UPP 270 then hands processing control to node DEXCS-Prefix 320, because it is the only child of DEXCS-Location 315a and DEXCS-System 31 5b. DEXCS-Prefix 320 parses a portion of the message. The UPP 270 then traverses the message graph hierarchy and hands control to one of the children, Acknowledge 325a, Clear 325b, Critical 325c, Minor 325d, or Major 325e. The parsing process proceeds in a similar fashion until a terminal node is reached. When the terminal node is reached, the raw message is completely parsed.

As described above, each message class parses a portion of the raw message. A message class can be considered as an abstraction of a set of specific messages generated by a network element. Each network element produces a unique message determined by the manufacturer of the element and requires a separate MCG for parsing. The overall structure of the MCG, such as how many nodes are in the MCG and what portion of the message the node parses, is determined by the user of the invention who is creating the MCG for a particular network element with GUI 220 or MCG editor 230. For example, a subset of messages Acknowledge 325a, Clear 325b, Critical 325c, Minor 325d, or Major 325e can be represented by a message class DEXCS-Prefix 320. While these message classes represent portions of the message defined by the manufacturer of a particular network element, the DEXCS-Prefix is a generalized class created by the user of the invention who is creating the message class grammar using the GUI 220 or the MCG editor 230.

One skilled in the art will understand that a user of the present invention could produce various MCGs for a given network element. The process of creating the MCG is unique. For example, one user may create an MCG for a network element with 50 nodes, and another user may create an MCG for the same element with only 4 nodes. The MCG with only 4 nodes requires more complicated message classes than the MCG with 50 nodes because each message class will have to parse a larger portion of the message.

Figure 4:
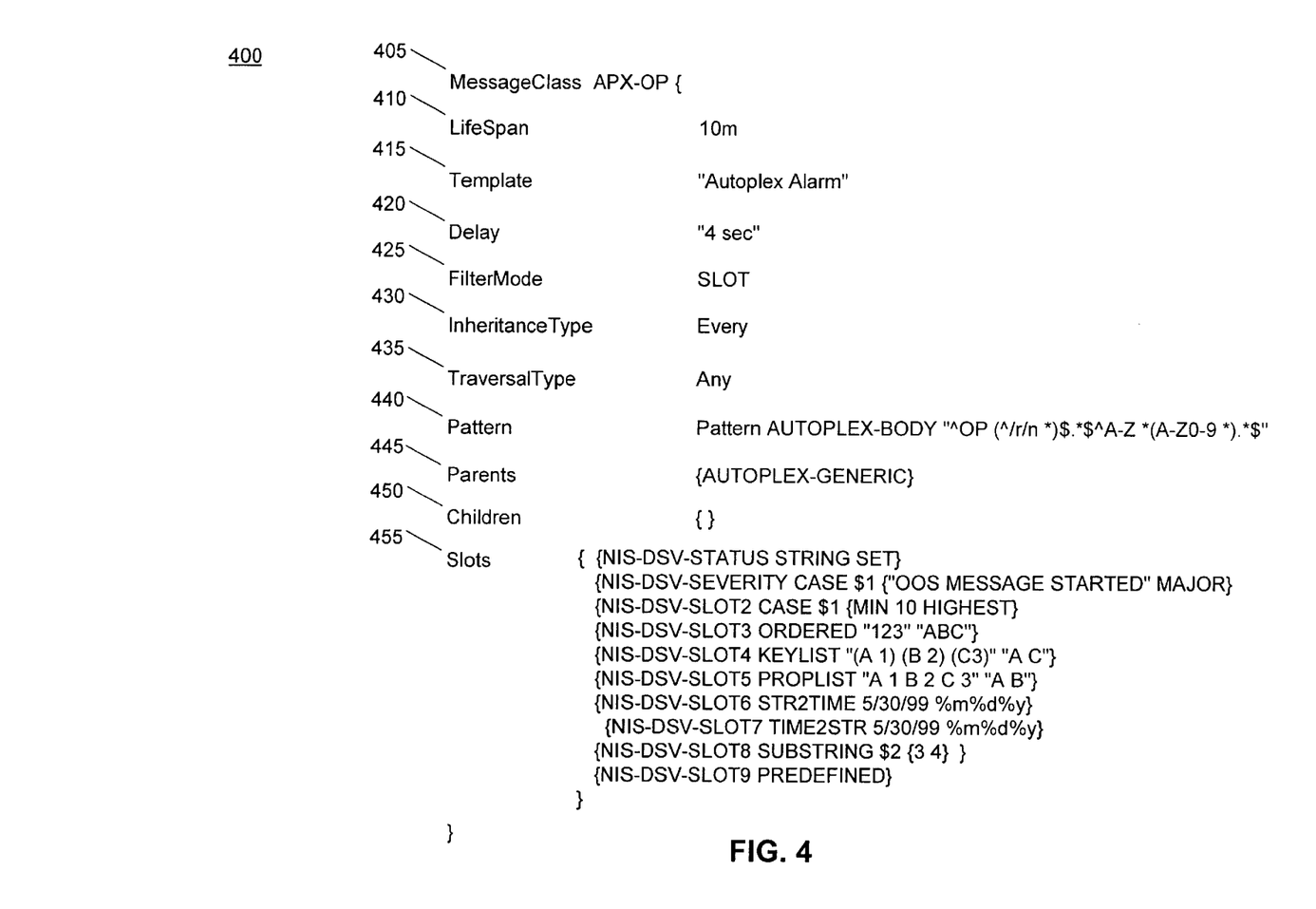
FIG. 4 is an exemplary object message class consistent with the systems and methods of the present invention.

FIG. 4 provides an exemplary depiction of a message class object 400 suitable for use with the systems and methods of the present invention. The message class object generally includes a class name field 405, reference to a related network element class, a listing of super-classes (parents) 445 and sub-classes (children) 450 to which the object belongs, respectively, a pattern field 440 to be matched to recognize the class during the parsing process, and methods for performing message transliteration, translation and other related functions described by slot field 455.

In the example shown in FIG. 4, the message class 405 name is APX-OP. Message class 405 is a node in the MCG hierarchy. A short description of the portion of the message being parsed, "Autoplex Alarm", is provided in template field 415 as a user-recognizable segment. All of the message segments generated during the processing of each node of the MCG will be concatenated to form one user-oriented alarm message. The parent 445, or super-class, for message APX-OP is "AUTOPLEX-GENERIC". The children field 450 is empty signifying that this is a terminal node.

As previously described, the UPP 270 traces the MCG from its root node along the classsubclass arcs until a terminal node is reached. MCG initiates a parsing operation by attempting to match pattern field 440 to text within the raw message. If the pattern string in pattern field 440 is present, a portion of the message is parsed by the node. Relevant information from the parsed message fragment is entered into slots 455. After the node completes the parsing for its subpart of the message, UPP 270 traverses the hierarchy breadthwise until it reaches the next node, lower class child, whose pattern field 440 matches the raw message text. This procedure repeats until a terminal node is reached. Once the terminal node is reached, the message has been fully parsed.

Slots 455 performs various operations on the parsed portions of the incoming messages. These operations convert the parsed message portions into a readable format to allow for their interpretation and evaluation by system operators. The slot type operations may select a specified portion of the parsed segment, arrange the information into a certain order, search for a particular portion and define its equivalent meaning, or convert internal representations to a human readable format. Each of the slots may define a particular filtering, interpretation, ordering, or conversion of the parsed message to a format that is both readable and understandable to humans.

Before parsing its subpart of the raw message, the message class must filter the subpart of the raw message. The method of how the node performs this filtering and ultimately parses each piece of information contained in the subpart of the message is defined by a filter mode field 425. Generally, this field defines the type of filtering performed on the raw message by the message class. In FIG. 4, the filter mode is set to "SLOT". In this mode, each message that matches pattern 440 is filtered from the raw message.

As shown in FIG. 4, message class object 400 may also include a life span field 410 and a delay field 420. Life span field 410 defines the length of time the message remains in a correlation memory buffer. In this example, it is 10 minutes. Delay field 420 provides the length of time that a message is delayed before entering the event correlation service. The delay restores the order of the messages entering the correlation service which might be distorted due to physical delays in the message communication lines. The delay for the example in FIG. 4 is 4 seconds. Delay field 420 and life span field 410 are not used for parsing, but may be used by subsequent services, such as event correlation.

Additional fields included in the embodiment shown in FIG. 4 include an inheritance type 430 and a traversal type 435. Inheritance type 430 and traversal type 435 may be "every" or "any". During operation, inheritance type field determines how particular features, such as slot values, are inherited by message classes from their parents, while traversal type defines how UPP 270 traverses the MCG hierarchy. If "every" is selected for traversal, the UPP visits each child node listed in children field 450, regardless of whether a child with a pattern 440 that matched the raw message was found. In this fashion, each child can provide additional information. If "any" is selected, the UPP visits each child node listed in children field 450 until a child has been identified as a match. Once a match has occurred, the UPP travels to the next lower level without visiting the remaining, non-matching children.

Figure 5:
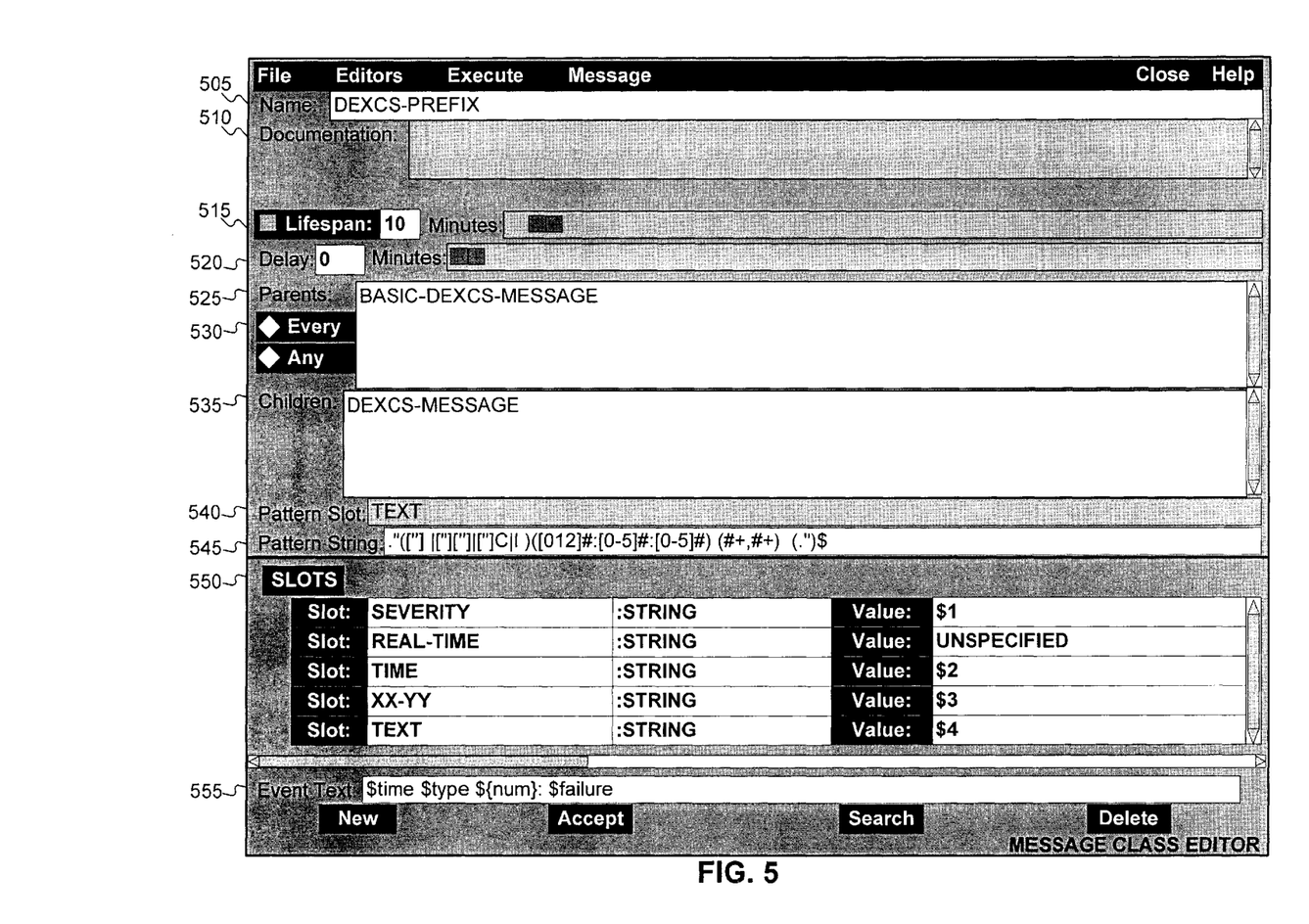
FIG. 5 is a representative view of a message class editor screen of a graphical user interface (GUI) showing an exemplary message class that may be used in accordance with systems and methods consistent with the present invention.

FIG. 5 shows an example of a message class editor screen of GUI 220 consistent with systems and methods of the present invention. GUI 220 provides a structured editor which provides instructions for the user on developing the MCG. GUI 220 may contain fields in which the entries may be typed in or selected from a menu. There also may be editable fields that are not used by the parser and serve only to provide information to the user. The message class editor screen of GUI 220 provides a screen in which a user may edit a message class of the MCG.

A field 505 provides the name of the node of the MCG that the user is currently editing. The user may type the name of the node in this field. A documentation field 510 allows the user to provide helpful comments or other information. Documentation 510 is ignored during parsing. A lifespan field 520 defines the length of time the message will last on the display before being cleared. Similarly, delay field 525 provides the length of time that a message is delayed before entering the event correlation service. Delay field 520 and life span field 515 do not affect the parsing operation, but may be used in subsequent services, such as event correlation. The values of lifespan 515 and delay field 520 may be typed in by the user.

A parents field 525 identifies the parents to the node identified in name field 505. Because the MCG is an acyclic graph, i.e. two or more nodes may collapse into one node, a node may have more than parent. In FIG. 5, the node DEXCS-PREFIX has one parent, BASIC-DEXCS-MESSAGE. If the node is a root node, parent field 525 would be empty signifying that a parent does not exist. A children field 535 identifies the children to the node identified in name field 505. In FIG. 5, the node DEXCS-PREFIX has one child, DEXCS-MESSAGE. If the node identified in name 505 is a terminal node, children field 535 would be empty signifying that no children exist.

A field every/any 530 allows the MCG to guide the manner in which the UPP traverses the MCG. For example, if "every" is selected, the UPP visits each child listed in children field 535, even after finding the child node which will parse a portion of the message. In this fashion, each child can provide additional information. If "any" is selected, the UPP visits each child listed in children field 535 until a child has been identified as a match. Once a match has occurred, the UPP travels to the next lower level without visiting the remaining, non-matching children.

A pattern slot 540 indicates to the node identified in name field 505 where to get the message to be parsed. Each time a node is matched, the node parses a subpart of the message. The remaining part of the message that has not been parsed is saved for the next child to use during parsing. In FIG. 5, DEXCS-PREFIX knows to get the portion of the message remaining to be parsed at slot TEXT of its parent. While multiple parents may be listed in parent field, the node remembers from which parent of multiple possible parents it originated during the parsing sequence of the raw message. After the node parses its portion of the message, it will save the remaining subpart of the raw message in a specific slot for its children to retrieve.

A pattern string 545 allows the node to recognize a specific piece of the message it is to parse. If the pattern string is not found in the message portion retrieved from the parent, UPP 270 travels to the next sibling. The next message will attempt to match its pattern string field to the message structure. Once a node has matched the pattern string, it will parse the message. If none of the children have a pattern string that matches the message, an error has occurred. The error may be a bug in the MCG, such as when a manufacturer has modified the raw messages and the grammar has not been updated to reflect the change, or an error in the equipment, although the latter is unlikely.

During parsing, certain information is retrieved from the raw message and saved in slots 550. Because vendors choose to express information in different formats, the retrieved information may need to be translated into a unified format by slots 550. For example, different vendors may choose "CR", "***", or "*CR" to represent a critical message. Slots 550 may translate these various expressions, each in a different MCG, into a standard representation, such as "CRITICAL".

In general, slots 550 provide instructions on what to do during parsing. For example, FIG. 5 shows five slots. Each of the slots shown are string slot types. The first slot is named SEVERITY and has a slot value of "$1". The slot value tells where to obtain the information to be retrieved from the raw message. In a string slot type, the slot takes a value of the message at the specified location, "$1," here. Other slot types include a multi-choice, or CASE, slot type. A case type slot allows translation of the retrieved information into a standard, or uniform, format. For example, if a pattern "*" is found at a specified value, such as "$1", of the raw message, the pattern "*" may be decoded as "MINOR". However, if a pattern of "**", "*C", or "I" is found, the pattern may be decoded as "MAJOR", "CRITICAL", or "CLEAR", respectively. The fifth slot of FIG. 5 specifies where the remaining raw message will be saved for its children to parse.

An event text field 555 defines what information will be displayed to the screen when the entire message is parsed. The event text 555 may display any information retrieved from the raw message during parsing. That is, it may include information that is not determined during the parsing performed by the node named in name field 505.

Each of the fields in the GUI in FIG. 5 may be edited by a user. In this fashion, a nonprogrammer may edit the parser with updated information from the manufacturer of a network element without having programming knowledge.

Figure 6:
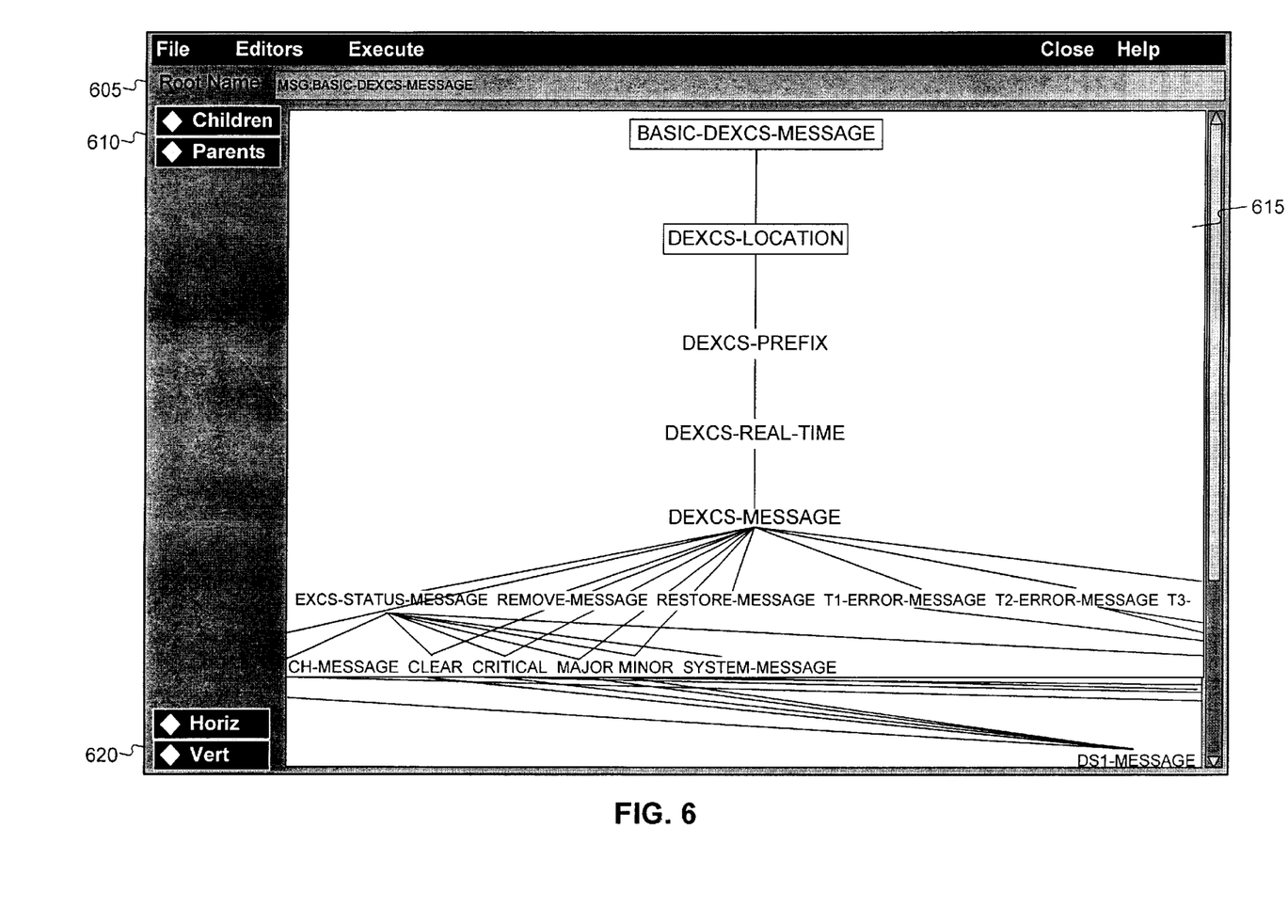
FIG. 6 is a representative view of a graph display screen of a graphical user interface (GUI) showing an exemplary message class hierarchy that may be used in accordance with systems and methods consistent with the present invention.

FIG. 6 shows an example of a graph display screen 615 of GUI 220 consistent with systems and methods of the present invention. The graph display screen 615 of GUI in FIG. 6 allows a user to view and edit the message class grammar graphically. In this GUI, the user may edit the overall structure of the MCG by clicking on nodes and re-arranging its position. To edit the parsing procedure performed by an individual node, a user may double-click a node, i.e. with a mouse, to bring up the message class editor screen shown in FIG. 5. That is, the multiple GUI screens of GUI 220 are linked so that changes to the MCG in one screen are reflected in the other screens. Changes in the GUI screen of FIG. 5 would be shown in FIG. 6, and vice versa.

The graph display screen 615 may be viewed in various formats at the user's discretion. For example, the children or parents of a node, whose root node is listed in the root name field 605, may be viewed by selecting "Children" or "Parents" in children/parents field 610 after selecting the node of interest by highlighting the node with a mouse, for example. A horizontal/vertical field 620 allows the hierarchy to be viewed horizontally or vertically. Further, the user may use zoom functions, such as zoom in and zoom out, to select an appropriate viewing area.

Figure 7:
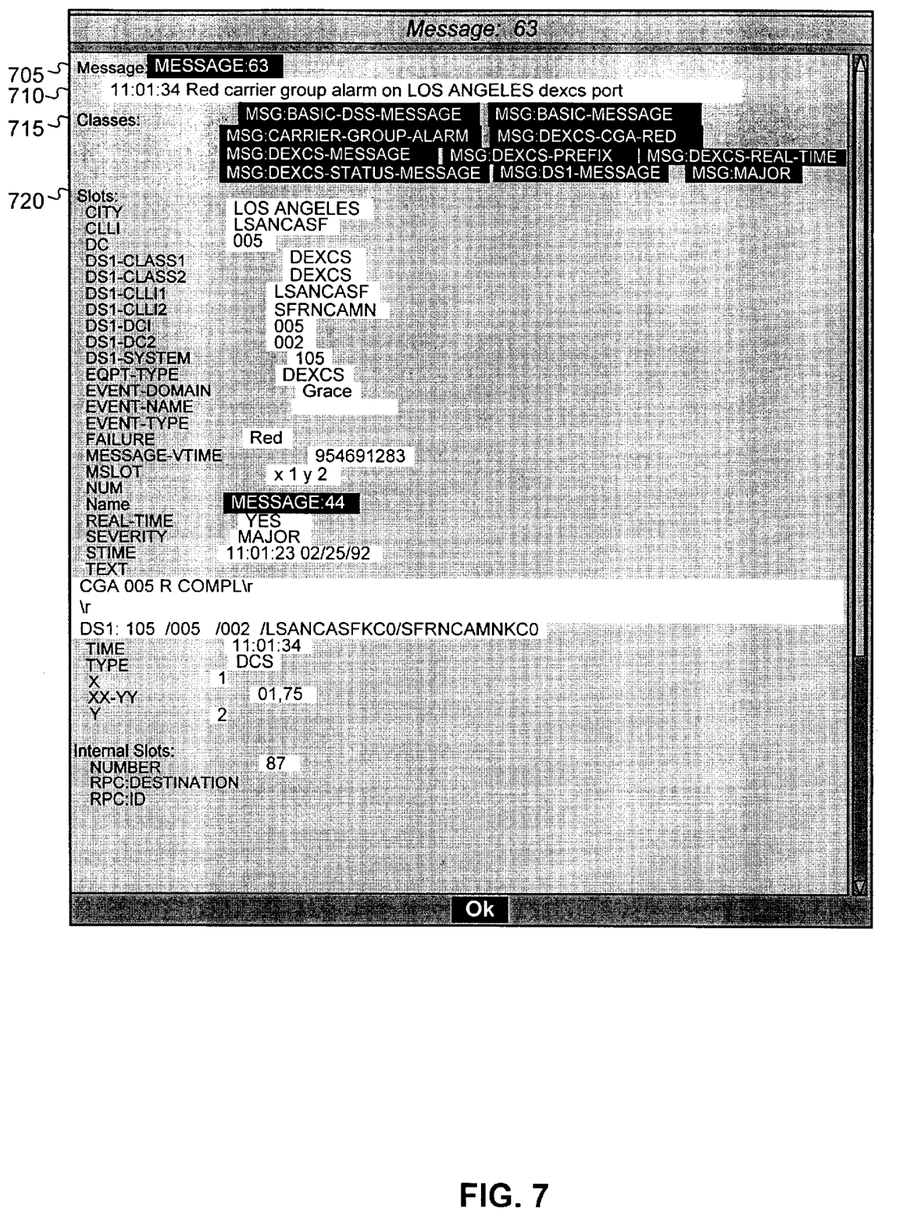
FIG. 7 is a representative view of a message screen of a graphical user interface (GUI) showing an exemplary output of the parsed message that may be used in accordance with systems and methods consistent with the present invention.
Figure 8:
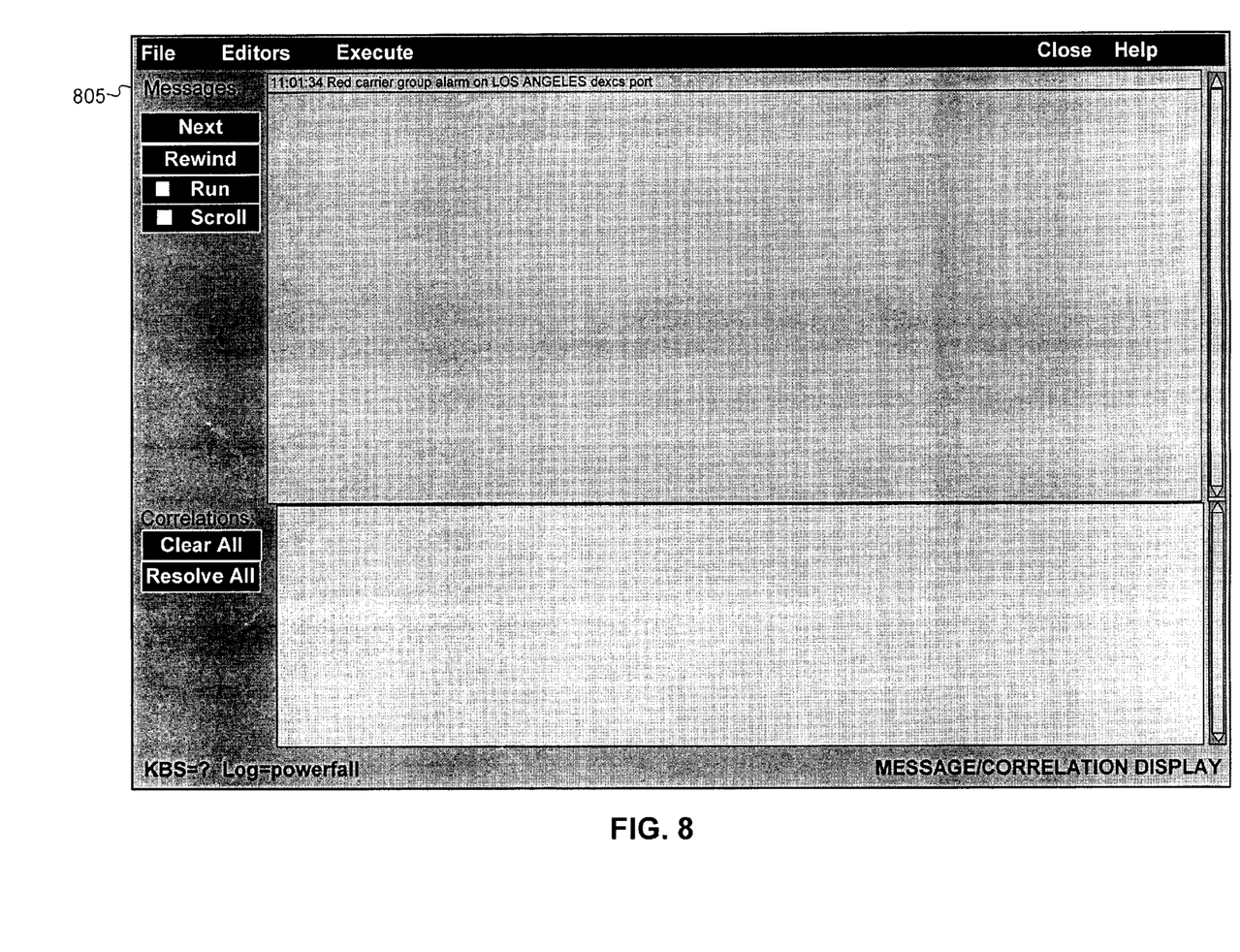
FIG. 8 is a representative view of an output screen of the message parser showing an exemplary output of the parsed message that may be used in accordance with systems and methods consistent with the present invention.

FIG. 7 shows an example of a message screen of GUI 220 consistent with systems and methods of the present invention. The message screen provides the output of the message parser. A field message 705 provides a link, in this case MESSAGE:63, to the raw message. Clicking on MESSAGE:63 brings up a window that displays the raw message to the user. The parsed message is displayed in an output message field 710. The format of the message displayed in output message field 710 is determined by the field event text 555 in the message class screen. A classes field 715 provides links to the nodes, message classes, that parsed portions of the raw messages or provided other supportive information during parsing. A user may click on the link to a node listed in field 715 to open the message class editor screen shown in FIG. 5 for that node. A slots field 720 provides the output of the operations performed by the slots of each message class during parsing.

In one embodiment, a parsing knowledge structure called a Message Class Grammar (MCG) contains the set of all potential pre-calculated parsing sequences for an active network element. The MCG may be customized to the messages of different active network elements. A universal parsing procedure (UPP) may be used to traverse the hierarchy structure of the MCG. Tracing the MCG hierarchy from the root node along class-subclass arcs until a terminal node is reached determines the parsing sequence for a particular message. The MCG may be developed with a text editor or with a graphical user interface that enables a non-programmer to edit the parser structure.

It will be apparent to those skilled in the art that various modifications and variations can be made to the disclosed embodiment of the present invention without departing from the scope or spirit of the invention. Other embodiments of the invention will be apparent to those skilled in the art from consideration of the specification and practice of the embodiment of the invention disclosed herein. The specification and examples should be considered exemplary, with the true scope and spirit of the invention being indicated by the following claims and their full range of equivalents.

What is claimed is:

1. A system for parsing network messages, comprising:
   a parser knowledge structure on a computer readable medium comprising a hierarchal graph of message classes, wherein each message class parses a portion of the message; and
   a universal parsing procedure means for driving the parser knowledge structure including means for receiving a remaining portion of the message being parsed from a higher level message class if message class parsing the portion of the message is not the root node, or retrieving and the message from the notification service if the message class performing the method is the root node.

2. A system according to claim 1, wherein the hierarchal graph of message classes further includes at least one terminal node, and the universal parsing procedure means comprises instructions on how to traverse the hierarchy of message classes from the root node to the terminal node, wherein the message is completely parsed after reaching the terminal node.

3. A system according to claim 1, further comprising:
   a developer for building the parser knowledge structure;
   a message validating component for validating the accuracy of the built parser knowledge structure; and
   a repository for storing at least one validated parser knowledge structure.

4. A system according to claim 3, wherein the developer is a graphical user interface structured to enable a non-programmer to develop the parser knowledge structure.

5. A system according to claim 4, wherein the graphical user interface comprises multiple, linked screens.

6. A system according to claim 3, wherein the developer is a text editor.

7. A system according to claim 1, wherein each message class of the parser knowledge structure comprises:

a pattern string to compare to the message;

an instruction on how to parse a portion of the message corresponding to the pattern string if the pattern string matches the message; and a means for specifying a location for storing a portion of the message remaining to be parsed.

8. A method for parsing messages in a distributed component network management system with a parser knowledge structure comprising a hierarchal graph of message classes having a root node and at least one terminal node, wherein each message class parses a portion of the message, the method performed by each message class, comprising:

retrieving a message;

determining whether a pattern string of a message class matches the message;

parsing a portion of the message corresponding to the pattern string if the pattern string matches the message; and saving a remaining portion of the message to be parsed in a predetermined location; wherein the step of retrieving a message comprises retrieving a remaining portion of the message to be parsed from a higher level message class if the message class performing the method is not the root node, or retrieving the message from the distributed-component network management system if the message class performing the method is the root node.

9. A method as recited in claim 8 wherein the parsing comprises:

traversing the parser knowledge structure comprising the hierarchal graph of message classes from the root node to the terminal node, wherein each message class parses a portion of the message and the message is completely parsed when the terminal node is reached; and providing the parsed message to the distributed-component network management system.

10. A method according to claim 9, further comprising:

accessing a parser structure from a repository.

* * * * *